United States Patent
Geng et al.

(10) Patent No.: US 12,010,576 B2
(45) Date of Patent: Jun. 11, 2024

(54) COMMUNICATION METHOD, APPARATUS, AND SYSTEM

(71) Applicant: Huawei Technologies Co., Ltd., Shenzhen (CN)

(72) Inventors: Tingting Geng, Shanghai (CN); Le Yan, Shenzhen (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 362 days.

(21) Appl. No.: 17/390,267

(22) Filed: Jul. 30, 2021

(65) Prior Publication Data

US 2021/0360498 A1 Nov. 18, 2021

Related U.S. Application Data

(63) Continuation of application No. PCT/CN2020/074026, filed on Jan. 23, 2020.

(30) Foreign Application Priority Data

Jan. 31, 2019 (CN) .......................... 201910098742.5
Sep. 30, 2019 (CN) .......................... 201910937699.7

(51) Int. Cl.
*H04W 36/08* (2009.01)
*H04W 36/00* (2009.01)

(52) U.S. Cl.
CPC ....... *H04W 36/08* (2013.01); *H04W 36/0005* (2013.01)

(58) Field of Classification Search
None
See application file for complete search history.

(56) References Cited

U.S. PATENT DOCUMENTS

| | | | |
|---|---|---|---|
| 10,050,971 B2 | 4/2018 | Zheng et al. | |
| 2005/0202828 A1* | 9/2005 | Pecen | H04W 36/0055 455/453 |

(Continued)

FOREIGN PATENT DOCUMENTS

| | | |
|---|---|---|
| CN | 101820395 A | 9/2010 |
| CN | 102244866 A | 11/2011 |

(Continued)

OTHER PUBLICATIONS

Qualcomm Incorporated et al., "KI#1 and2: Addressing open issues for solution 2", SA WG2 Meeting #129bis, S2-1811734, Nov. 26-30, 2018, 3 pages, West Palm Beach, USA.

(Continued)

*Primary Examiner* — Frantz Bataille
(74) *Attorney, Agent, or Firm* — Slater Matsil, LLP

(57) ABSTRACT

A communication method, apparatus, and system are disclosed, to provide a mechanism of mobility, of a terminal device that supports private networks, between the private networks. The method includes: a first access network device determines, based on a first list, a target cell that belongs to a target first network, where the first list includes an identity of at least one first network to which a terminal device subscribes. The first access network device sends a first message to a second access network device that serves the target cell, the first message carries a second list, the second list is used to enable the second access network device to determine the identity of the at least one first network to which the terminal device subscribes.

19 Claims, 10 Drawing Sheets

(56) References Cited

U.S. PATENT DOCUMENTS

2015/0312813 A1* 10/2015 Xu .................. H04W 36/0079
                                                                                       455/438
2019/0208497 A1    7/2019 Li et al.

FOREIGN PATENT DOCUMENTS

| CN | 107105501 A | 8/2017 |
|---|---|---|
| CN | 107318113 A | 11/2017 |
| CN | 108616950 A | 10/2018 |
| WO | 2018027995 A1 | 2/2018 |
| WO | 2018082673 A1 | 5/2018 |
| WO | 2018128528 A1 | 7/2018 |

OTHER PUBLICATIONS

Oppo, "Update to Solution 27", SA WG2 Meeting #129bis, S2-1811788, Nov. 26-30, 2018, 3 pages, West Palm Beach, USA.

3GPP TR 23.734 V16.0.0 (Dec. 2018), 3rd Generation Partnership Project; Technical Specification Group Services and System Aspects; Study on enhancement of 5GS for Vertical and LAN Services (Release 16), 107 pages.

3GPP TR 23.734 V1.0.0, 3rd Generation Partnership Project, Technical Specification Group Services and System Aspects, Study on 5GS Enhanced support of Vertical and LAN Services (Release 16), (Dec. 2018), 106 pages.

3GPP TS 38.300 V15.4.0, 3rd Generation Partnership Project, Technical Specification Group Radio Access Network, NR, NR and NG-RAN Overall Description, Stage 2 (Release 15), (Dec. 2018), 97 pages.

3GPP TS 38.413 V15.2.0, 3rd Generation Partnership Project, Technical Specification Group Radio Access Network, NG-RAN, NG Application Protocol (NGAP) (Release 15), (Dec. 2018), 308 pages.

3GPP TS 38.423 V15.2.0, 3rd Generation Partnership Project, Technical Specification Group Radio Access Network, NG-RAN, Xn application protocol (XnAP) (Release 15), (Dec. 2018), 281 pages.

3GPP TS 38.473 V15.4.1, 3rd Generation Partnership Project, Technical Specification Group Radio Access Network, NG-RAN, F1 application protocol (F1AP) (Release 15), (Jan. 2019), 192 pages.

3GPP TS 23.501 V15.4.0, 3rd Generation Partnership Project, Technical Specification Group Services and System Aspects, System Architecture for the 5G System, Stage 2 (Release 15), (Dec. 2018), 236 pages.

\* cited by examiner

COMMUNICATION METHOD, APPARATUS, AND SYSTEM

CROSS-REFERENCE TO RELATED APPLICATIONS

This application is a continuation of International Application No. PCT/CN2020/074026, filed on Jan. 23, 2020, which claims priority to Chinese Patent Application No. 201910098742.5, filed on Jan. 31, 2019, and Chinese Patent Application No. 201910937699.7, filed on Sep. 30, 2019. All of the aforementioned patent applications are hereby incorporated by reference in their entireties.

TECHNICAL FIELD

This application relates to the field of communication technologies, and in particular, to a communication method, apparatus, and system.

BACKGROUND

Currently, a concept of a private network is proposed in communication development. The private network is a concept relative to a public network, and may be understood as a privacy-sensitive network, for example, an internal network established in a company, a school, or a factory. User equipment (UE) that does not subscribe to the private network is not allowed to access the private network. The private network is also referred to as a non-public network, namely, an NPN. Generally, a private network type may be identified by using a private network identity (NPN identification, NPN ID). Different UEs support different NPN IDs. UE can camp only on an NPN corresponding to an NPN ID supported by the UE, and can initiate a service only in the NPN corresponding to the NPN ID to which the UE subscribes.

Currently, the private network can be deployed in the following modes:

1: The private network may be a cell served by a base station and a core network dedicated to the private network. UE that supports the private network can camp on and initiate a service in the base station and the core network. In the standard, this type of private network is generally referred to as a standalone (SA) NPN cell.

2: The private network may alternatively be a slice of a public network, that is, a slice in the public network may be configured as a private network. All UEs can camp on the network. After UE enters a connected state and initiates a service request, the network determines, based on whether the service is a private network service, to perform a service of the UE in a corresponding private network slice.

3: The private network may alternatively be a cell deployed by a public network operator. In the standard, this type of private network is generally referred to as a closed access group (CAG) cell, or a non-standalone (NSA) NPN cell.

4: Transmission of a private network service can be performed not only on the networks in the foregoing three types of deployment, but also on a public network that has a non-3GPP interworking function (N3IWF) interface with the private network. In other words, the private network service is not directly supported on public network resources, and the private network service can be transparently transmitted on the public network. After private network data reaches a data network (DN) of the public network, the private network data is sent to the private network through the N3IWF interface.

After the private network is introduced, a mechanism of mobility, of the UE that supports the private networks, between the foregoing four types of networks needs to be considered.

SUMMARY

This application provides a communication method, apparatus, and system, to provide a mechanism of mobility, of a terminal device that supports private networks, between the private networks.

According to a first aspect, this application provides a communication method. The method includes: A first access network device determines, based on a first list, a target cell that belongs to a target first network, where the first list includes an identity of at least one first network to which the terminal device subscribes. The first access network device sends a first message to a second access network device that serves the target cell, where the first message is used to indicate the second access network device to prepare to hand over the terminal device to the target cell, the first message carries a second list and/or an authentication parameter, the second list is used to enable the second access network device to determine the identity of the at least one first network to which the terminal device subscribes, the authentication parameter is from the terminal device, and the authentication parameter is used to enable the second access network device to authenticate the terminal device. In this embodiment of this application, the source access network device determines a target cell that belongs to the target private network, based on the identity of the at least one private network to which the terminal device subscribes, so as to select a proper target cell for the terminal device to be handed over to. In addition, the second list and/or the authentication parameter are/is carried in the first message, so that a target access network device may authenticate the terminal device based on the second list and/or the authentication parameter that are/is sent by the source access network device, so as to determine validity, security, and the like of the terminal device.

In a possible design, the first network may be a private network.

In a possible design, the first access network device may receive the first list sent by the terminal device. In the foregoing design, the first access network device may obtain subscription information of the terminal device from the terminal device.

In a possible design, the first access network device may alternatively receive the first list sent by a core network device. The first network corresponding to the first list obtained through the foregoing design is a network in which the terminal device is authenticated by the core network device. Therefore, the first access network device considers that the subscription information is true, and may select, directly based on the subscription information, a proper target cell that belongs to the target first network for the terminal device. In addition, the first access network device directly sends the subscription information of the terminal device to the second access network device, and the second access network device believes that the subscription information is true.

In a possible design, the first access network device may receive first information sent by the second access network device, where the first information includes at least one of the following information: an identity of a first network covered by the second access network device, an identity of a second network that supports communication with the second access network device, an identity of a first network that supports communication with the second access network device, information about a cell corresponding to a first network that supports communication with a second network and that is covered by the second access network device, or information about a cell corresponding to a second network that supports communication with a first network and that is covered by the second access network device. When the first access network device determines, based on the first list, the target cell that belongs to the target first network, the first access network device may determine, based on the first list and the first information, the target cell that belongs to the target first network. According to the foregoing design, the first access network device may obtain public network information and private network information that are supported by the second access network device, so that the first access network device selects a more appropriate cell when configuring neighboring cell measurement for the terminal device or when selecting a target cell for the terminal device to be handed over to.

In a possible design, the first access network device may determine the target first network based on the first list and the first information.

In a possible design, the first message may further carry indication information, the indication information is used to indicate a first parameter used by the terminal device to generate the authentication parameter, and the first parameter is a parameter that is pre-stored in the terminal device and used to generate the authentication parameter. According to the foregoing design, the second access network device can accurately determine the first parameter used by the terminal device to generate the authentication parameter, and therefore can accurately authenticate the terminal device.

In a possible design, the indication information may be specific content of the first parameter, or may be an index of the first parameter, or may be information about a time at which the first parameter is received by the terminal device.

In a possible design, the first access network device may determine a plurality of target first networks based on the first list, so that the first access network device may separately send the first message to second access network devices that serve the plurality of target first networks.

In a possible design, the first access network device receives a second message sent by the second access network device, where the second message is used to acknowledge that the second access network device allows the terminal device to be handed over to the target cell, and the second message carries an identity of the first network to which the target cell belongs. According to the foregoing design, when the first access network device determines the plurality of target first networks, a first access network may determine a target first network to which the terminal device can be handed over, so that the terminal device can be prevented from being handed over to another target first network.

Optionally, the first access network device may send, to the terminal device, the identity of the first network to which the target cell belongs.

In a possible design, the first access network device may send a third message to the terminal device, where the third message is used to indicate the terminal device to measure a cell or a frequency corresponding to the identity of the at least one first network. The first access network device receives a measurement result sent by the terminal device. In the foregoing design, the first access network device may determine the target first network based on the first list with reference to the measurement result sent by the terminal device, so as to select a more appropriate target first network for the terminal device.

In a possible design, if the terminal device enters an inactive state, the first access network device sends a fourth message to the terminal device, where the fourth message is used to indicate, to the terminal device, a radio-access-network (radio access network, RAN)-based notification area (RNA), and the RNA may indicate a notification area that is based on the first network.

In a possible design, the first access network device sends context information of the terminal device to the second access network device, where the context information carries an RNA configuration including first network information.

In a possible design, the first access network device may send a fifth message to the second access network device, where the fifth message is used to page the terminal device, and the fifth message may carry the first network information of the terminal device. According to the foregoing design, the second access network device may page, in a cell corresponding to the first network information, the terminal device based on the first network information of the terminal device.

According to a second aspect, this application provides a communication method. The method includes: A second access network device receives a first message sent by a first access network device, where the first message is used to indicate the second access network device to prepare to hand over a terminal device to a target cell, the first message carries a second list and/or an authentication parameter, the second list includes one or more identities of one or more first networks to which the terminal device subscribes, the second list is used to enable the second access network device to determine the identity of the at least one first network to which the terminal device subscribes, and the authentication parameter is used to enable the second access network device to authenticate the terminal device. If the first message carries the second list, the second access network device determines, based on the second list, the identity of the at least one first network to which the terminal device subscribes. If the first message carries the authentication parameter, the second access network device authenticates the terminal device based on the authentication parameter. In this embodiment of this application, the target access network device may authenticate the terminal device based on the second list and/or the authentication parameter that are/is sent by the source access network device, so as to determine validity, security, and the like of the terminal device.

In a possible design, the first network may be a private network.

In a possible design, the second access network device may further send a second message to the first access network device, where the second message is used to acknowledge that the second access network device allows the terminal device to be handed over to the target cell, and the second message may carry an identity of a first network to which the target cell belongs. According to the foregoing design, the first access network can determine a target first network to which the terminal device can be handed over, so that the terminal device can be prevented from being handed over to another target first network.

In a possible design, the second access network device may send a third message to a core network device, where the third information is used to indicate the core network device to perform path switching, the third message carries indication information, and the indication information is used to indicate whether the core network device sends the identities of the one or more first networks to which the terminal device subscribes. According to the foregoing design, the core network device may send, as indicated by the second access network device, the identities of the one or more first networks to which the terminal device subscribes.

In a possible design, the second access network device receives a fourth message sent by the core network device, where the fourth message is used to acknowledge that the core network device has completed the path switching, the fourth message carries the fourth list, and the fourth list includes the identities of the one or more first networks to which the terminal device subscribes. In the foregoing design, if the second access network device indicates, by using the indication information, the core network device to send the identities of the one or more first networks to which the terminal device subscribes, the core network device may send the identities of the one or more first networks through the fourth message.

In a possible design, the second access network device may send one or more second parameters to the terminal device, where the one or more second parameters are used to generate the authentication parameter. In the foregoing design, the terminal device may generate the authentication parameter based on the second parameter sent by the first access network device, so that the first access network device may check the validity and the security of the terminal device based on the authentication parameter.

In a possible design, the first message may further carry indication information, the indication information is used to indicate the one or more first parameters used by the terminal device to generate the authentication parameter, and the first parameter is a parameter that is pre-stored in the terminal device and used to generate the authentication parameter. According to the foregoing design, the first access network device may determine specific content of the first parameter based on the indication information, so as to accurately authenticate the terminal device.

In a possible design, the second access network device may receive context information of the terminal device sent by the first access network device, where the context information carries an RNA configuration including first network information.

In a possible design, the second access network device may receive a fifth message sent by the first access network device, where the fifth message is used to page the terminal device, and the fifth message may carry the first network information of the terminal device. According to the foregoing design, the second access network device may page, in a cell corresponding to the first network information, the terminal device based on the first network information of the terminal device.

According to a third aspect, this application provides a communication method. The method includes: A core network device determines one or more identities of one or more first networks to which a terminal device subscribes. The core network device sends a first list to an access network device, where the first list includes the identities of the one or more first networks to which the terminal device subscribes. In this embodiment of this application, the core network device sends the first list to the access network device, so that the access network device can obtain authenticated subscription information of the terminal device. In this way, the access network device may directly believe that the information about the terminal device's subscription to the first network corresponding to the first list is valid.

In a possible design, the access network device may be a source access network device accessed by the terminal device before the terminal device is handed over, or the access network device may be a target access network device accessed by the terminal device after the terminal device is handed over.

In a possible design, the core network device may send an initial context setup request message or a path switch request acknowledge message to the access network device, where the initial context setup request message or the path switch request acknowledge message carries the first list.

In a possible design, if the access network device may be the source access network device accessed by the terminal device before the terminal device is handed over, the core network device may send the first list to the access network device through the initial context setup request message. If the access network device may be the target access network device accessed by the terminal device after the terminal device is handed over, the core network device may send the first list to the access network device through the path switch request acknowledge message.

In a possible design, before the core network device determines the identities of the one or more first networks to which the terminal device subscribes, the core network device may determine that the terminal device supports the first network.

In a possible design, the core network device may receive indication information sent by the access network device, where the indication information is used to indicate the core network device to send, to the access network device, the identities of the one or more first networks to which the terminal device subscribes. In the foregoing design, the core network device may send the first list as indicated by the access network device, thereby improving flexibility.

In a possible design, if the access network device may be the source access network device accessed by the terminal device before the terminal device is handed over, the indication information may be used to indicate whether the core network device sends, to the target access network device accessed by the terminal device after the terminal device is handed over, the identities of the one or more first networks to which the terminal device subscribes.

In a possible design, the core network device may receive the third list sent by the access network device, where the third list is determined based on the subscription information received by the access network device from the terminal device. In the foregoing design, the core network device may obtain the subscription information of the terminal device through the access network device, so as to determine the first networks to which the terminal device subscribes.

According to a fourth aspect, this application provides a communication method. The method includes: A terminal device obtains one or more second parameters sent by a second access network device that serves a target cell corresponding to a target first network. The terminal device generates an authentication parameter based on stored one or more first parameters and the obtained one or more second parameters, where the authentication parameter is used to enable the second access network device to authenticate the terminal device. The terminal device sends the authentication parameter to a first access network device, where the first access network device is an access network device accessed by the terminal device. In this embodiment of this application, in the parameters used by the terminal device to generate the authentication parameter, some parameters are the originally stored parameters, and some parameters come from the second access network device. In this way, even if another device receives the parameters sent by the second access network device, the device cannot generate a correct authentication parameter. Compared with a manner in which all parameters used to generate the authentication parameter are sent by the second access network device, in this embodiment of this application, another device can be prevented from accessing the second access network device, thereby improving network security.

In a possible design, the terminal device sends indication information to the first access network device, where the indication information is used to indicate a first parameter used by the terminal device to generate the authentication parameter. According to the foregoing design, the first access network device may determine specific content of the first parameter based on the indication information, so as to accurately authenticate the terminal device.

In a possible design, the terminal device may further receive an identity of the target first network from the first access network device. The terminal device may determine, based on the received identity of the target first network, the target first network accessed in the target cell, and be handed over to the target cell covered by the second access network device.

According to a fifth aspect, this application provides an apparatus. The apparatus may be a first access network device, or may be a chip or a chip set in a first access network device; or may be a second access network device, or may be a chip or a chip set in a second access network device; or may be a core network device, or may be a chip or a chip set in a core network device; or may be a terminal device, or may be a chip or a chip set in a terminal device. The apparatus may include a processing unit and a transceiver unit.

In a possible design, when the apparatus is the first access network device, the second access network device, the core network device, or the terminal device, the processing unit may be a processor, and the transceiver unit may be a transceiver. The apparatus may further include a storage unit, and the storage unit may be a memory. The storage unit is configured to store instructions, and the processing unit executes the instructions stored in the storage unit, so that the first access network device performs corresponding functions in the first aspect. Alternatively, the processing unit executes the instructions stored in the storage unit, so that the second access network device performs corresponding functions in the second aspect. Alternatively, the processing unit executes the instructions stored in the storage unit, so that the core network device performs corresponding functions in the third aspect. Alternatively, the processing unit executes the instructions stored in the storage unit, so that the terminal device performs corresponding functions in the fourth aspect.

In a possible design, when the apparatus is the chip or the chip set in the first access network device, or the chip or the chip set in the second access network device, or the chip or the chip set in the core network device, or the chip or the chip set in the terminal device, the processing unit may be a processor, and the transceiver unit may be an input/output interface, a pin, a circuit, or the like. The processing unit executes the instructions stored in the storage unit, so that the chip or the chip set in the first access network device performs the corresponding functions in the first aspect. Alternatively, the processing unit executes the instructions stored in the storage unit, so that the chip or the chip set in the second access network device performs the corresponding functions in the second aspect. Alternatively, the processing unit executes the instructions stored in the storage unit, so that the chip or the chip set in the core network device performs the corresponding functions in the third aspect. Alternatively, the processing unit executes the instructions stored in the storage unit, so that the chip or the chip set in the terminal device performs the corresponding functions in the fourth aspect. The storage unit may be a storage unit (for example, a register or a buffer) in the chip or the chip set, or may be a storage unit (for example, a read-only memory or a random access memory) that is in the terminal device and that is located outside the chip or the chip set.

According to a sixth aspect, an apparatus is provided, including a processor, a communication interface, and a memory. The communication interface is configured to perform transmission of information, and/or a message, and/or data between the apparatus and another apparatus. The memory is configured to store computer executable instructions. When the apparatus runs, the processor executes the computer executable instructions stored in the memory, so that the apparatus performs the communication method according to any one of the first aspect or the possible designs of the first aspect, the communication method according to any one of the second aspect or the possible designs of the second aspect, the communication method according to any one of the third aspect or the possible designs of the third aspect, or the communication method according to any one of the fourth aspect or the possible designs of the fourth aspect.

According to a seventh aspect, this application further provides a communication system. The system includes the first access network device in any embodiment of the first aspect, the second access network device in any embodiment of the second aspect, the core network device in any embodiment of the third aspect, and the terminal device in any embodiment of the fourth aspect.

According to an eighth aspect, this application further provides a computer-readable storage medium. The computer-readable storage medium stores instructions; and when the instructions are run on a computer, the computer is enabled to perform the methods according to the foregoing aspects.

According to a ninth aspect, this application further provides a computer program product including instructions. When the computer program product runs on a computer, the computer is enabled to perform the methods according to the foregoing aspects.

DETAILED DESCRIPTION OF ILLUSTRATIVE EMBODIMENTS

To make objectives, technical solutions, and advantages of embodiments of the present invention clearer, the following clearly describes the technical solutions in the embodiments of the present invention with reference to the accompanying drawings in the embodiments of the present invention.

Currently, a concept of a private network is proposed in communication development. The private network is a concept relative to a public network, and may be understood as a privacy-sensitive network, for example, an internal network established in a company, a school, or a factory. User equipment (UE) that does not subscribe to the private network is not allowed to access the private network. The private network is also referred to as a non-public network, namely, an NPN. Generally, a private network type may be identified by using a private network identity (NPN identification, NPN ID). Different UEs support different NPN IDs. UE can camp only on an NPN corresponding to an NPN ID supported by the UE, and can initiate a service only in the NPN corresponding to the NPN ID to which the UE subscribes.

Figure 1A:
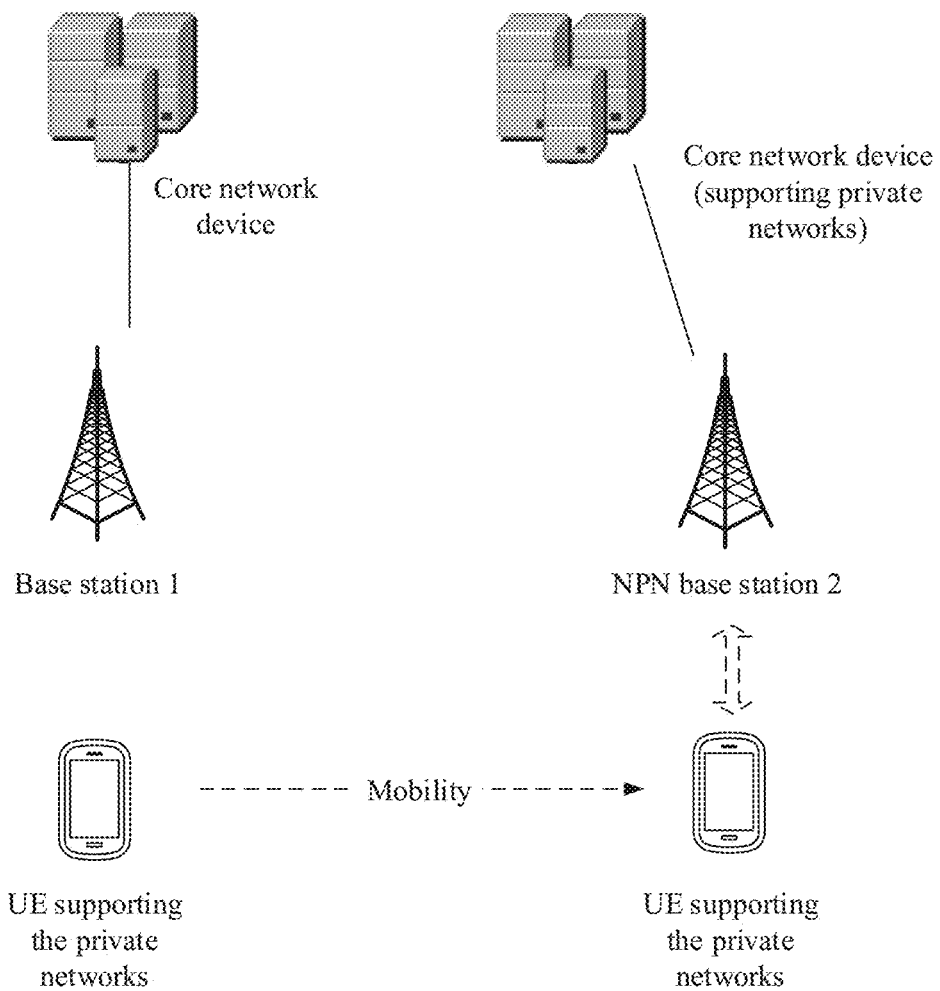
FIG. 1A is a schematic diagram of a deployment of a private network according to an embodiment of this application.

Currently, the private network can be deployed in the following modes:

1: The private network may be a cell that is served by a base station or a core network dedicated to the private network. UE that supports the private network can camp on and initiate a service in the base station and the core network. In the standard, this type of private network is generally referred to as a standalone (SA) NPN cell. A possible deployment mode is shown in FIG. 1A.

2: The private network may alternatively be a slice of a public network, that is, a slice in the public network may be configured as a private network. All UEs can camp on the network. After UE enters a connected state and initiates a service request, the network determines, based on whether the service is a private network service, to set a service of the UE to a corresponding private network slice.

Figure 1B:
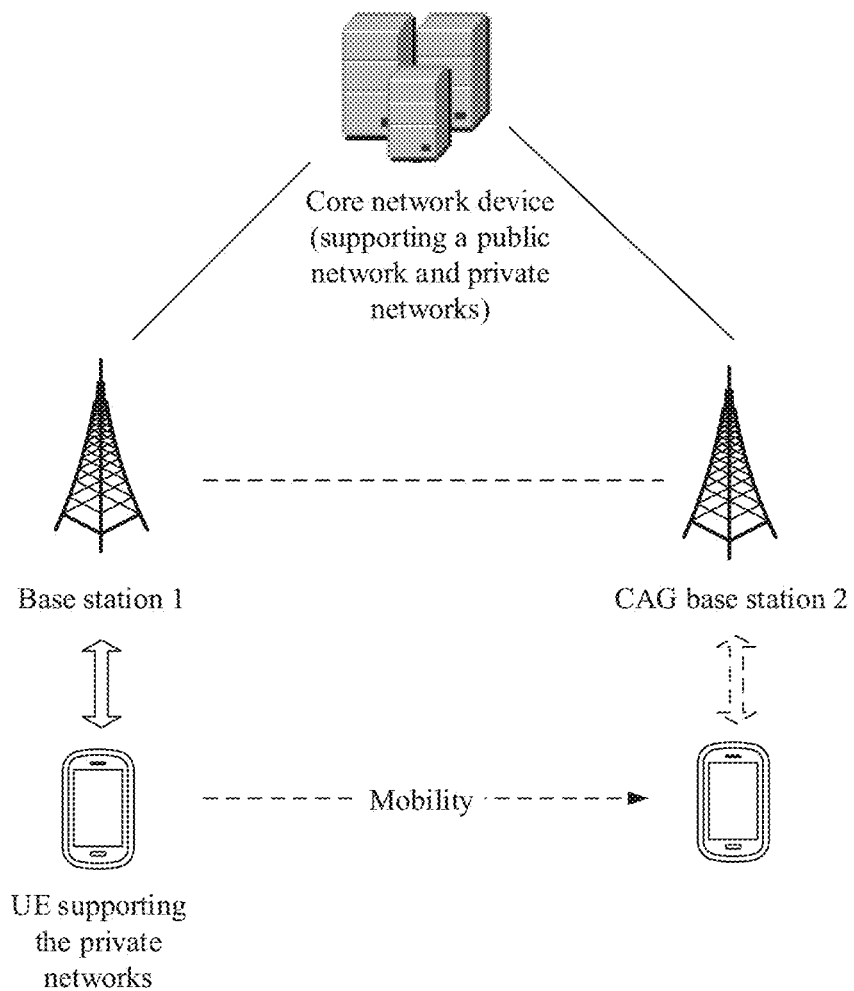
FIG. 1B is a schematic diagram of another deployment of a private network according to an embodiment of this application.

3: The private network may alternatively be a cell deployed by a public network operator. In the standard, this type of private network is generally referred to as a closed access group (CAG) cell, or a non-standalone (NSA) NPN cell. A possible deployment mode is shown in FIG. 1B.

Figure 1C:
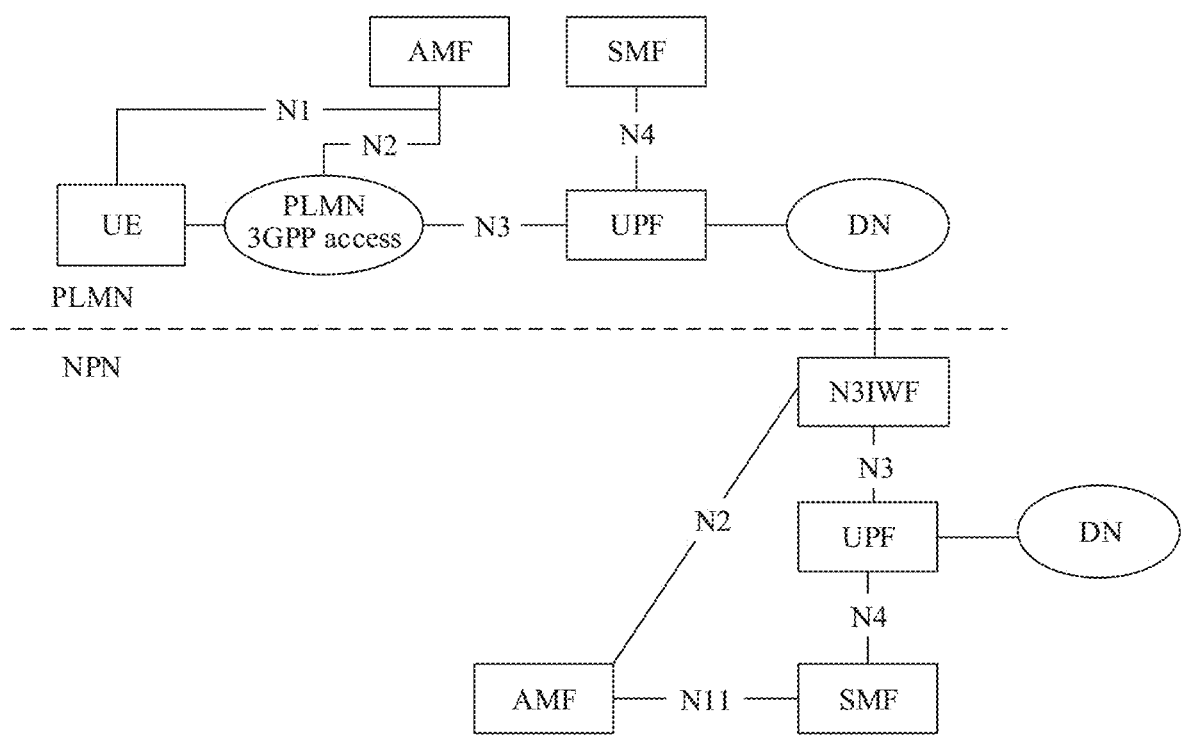
FIG. 1C is an architectural diagram in which a public network supports a private network service by using an N3IWF interface according to an embodiment of this application.

4: Transmission of a private network service can be performed not only on the networks in the foregoing three types of deployment, but also on a public network that has a non-3GPP interworking function (non-3GPP inter working function, N3IWF) interface with the private network. In other words, the private network service is not directly supported on public network resources, and the private network service can be transparently transmitted on the public network and then sent to the private network through the N3IWF interface. A possible deployment mode is shown in FIG. 1C. After data of a private network reaches a data network (DN) of a public network, the data is sent to the private network through the N3IWF interface.

Optionally, network devices corresponding to the modes 1 to 3 can directly support the private network service on an air interface, and therefore this support may be referred to as direct support. In the mode 4, the air interface does not support the private network service, and the private network service needs to be supported in the public network by using an N3IWF interface. Therefore, this transmission manner may also be referred to as indirect support.

It may be understood that, in the mode 4, an example in which the public network supports the private network service by using the N3IWF is used for description, and a case in which the private network supports the public network service by using the N3IWF also exists.

For example, FIG. 1C is an architectural diagram in which a public network supports a private network service by using an N3IWF interface. The public network may include a public land mobile network (PLMN) 3rd generation partnership project (3GPP) access (PLMN 3GPP access) node, an access network device, a user plane function (UPF) entity, an access and mobility management (AMF) entity, a session management function (SMF) entity, a DN, and the like. The private network may include an access network device, a UPF, an AMF, an SMF, a DN, and the like that correspond to the private network. The public network and the private network can communicate with each other through an N3IWF. PLMN access in the public network is connected to the UPF in the public network through an N3 interface, UE is connected to an AMF in the public network through an N1 interface, PLMN PLMN access in the public network is connected to the AMF in the public network through an N2 interface, the AMF in the public network is connected to the SMF in the public network through an N11 interface, the SMF in the public network is connected to the UPF in the public network through an N4 interface, the UPF in the public network is connected to the DN in the public network, and the DN in the public network is connected to the N3IWF. The N3IWF is connected to the UPF in the private network through an N3 interface, the N3IWF is connected to the AMF in the private network through an N2 interface, the UPF in the private network is connected to the AMF in the private network through an N4 interface, and the AMF in the private network is connected to the SMF in the private network through an N11 interface.

After the private network is introduced, UEs can be simply classified into three types: private network UE, that is, UE that subscribes only to the private network, for example, an intelligent terminal such as a smartphone in a factory; UE that supports both the private network and the public network, for example, a mobile phone of a user that accesses the private network; and public network UE, that is, UE that subscribes only to the public network, where this type of UE does not apply to the private network. For the foregoing three types of UEs, the first two types of UEs are applicable to the private network, and the third type of UE is not applicable to the private network.

Communication methods provided in the embodiments of this application may be used in a communication system. An architecture of the communication system may be shown in FIG. 2, and includes a first access network device, a second access network device, a core network device, and a terminal device. The communication system in the embodiments of this application may be various types of communication systems, for example, may be a long term evolution (LTE) communication system, or may be a 5th generation (5G) communication system, or may be a communication system having a hybrid architecture of LTE and 5G, or may be a future communication system. In the communication system in the embodiments of this application, data transmission may be performed between the access network device and the terminal device in manners that include but are not limited to radio wave, visible light, laser, infrared, optical photon, power line, optical fiber, coaxial cable, copper strand cable, and the like.

A private network may be deployed in the communication system in the embodiments of this application. A deployment mode of the private network may be but is not limited to the deployment mode in any one of FIG. 1A to FIG. 1C.

The first access network device and the second access network device may each be a common base station (for example, a NodeB or an eNB), a new radio controller (NR controller), a gNodeB (gNB) in a 5G system, a centralized unit (CU), a new radio base station, a radio remote module, a micro base station, a relay, a distributed unit (DU), a transmission reception point (TRP), a transmission point (TP), or any other radio access device. This is not limited in the embodiments of this application.

The core network device may be a mobility management function (access and mobility management function, AMF) entity.

The terminal device is also referred to as user equipment (UE), and is a device, for example, a handheld device or a vehicle-mounted device having a wireless connection function, providing voice and/or data connectivity for a user. A common terminal includes, for example, a mobile phone, a tablet, a notebook computer, a palmtop computer, a mobile internet device (MID), and a wearable device such as a smartwatch, a smart band, or a pedometer.

After the private network is introduced, a mechanism of mobility, of the UE that supports the private networks, between the foregoing four types of networks needs to be considered. Therefore, an embodiment of this application provides a communication method, to provide a mechanism of mobility, of a terminal device, between private networks. The method and the apparatus are based on a same inventive concept. Because a problem-resolving principle of the method is similar to that of the apparatus, mutual reference may be made between implementation of the apparatus and implementation of the method, and no repeated description is provided.

The following describes some terms in this application, to facilitate understanding of a person skilled in the art.

"A plurality of" refers to two or more than two.

In addition, it should be understood that in the descriptions of this application, terms such as "first" and "second" are merely used for distinguishing and description, but should not be understood as indicating or implying relative importance, or should not be understood as indicating or implying a sequence.

The following describes in detail wireless communication methods provided in this application with reference to the accompanying drawings.

Figure 2:
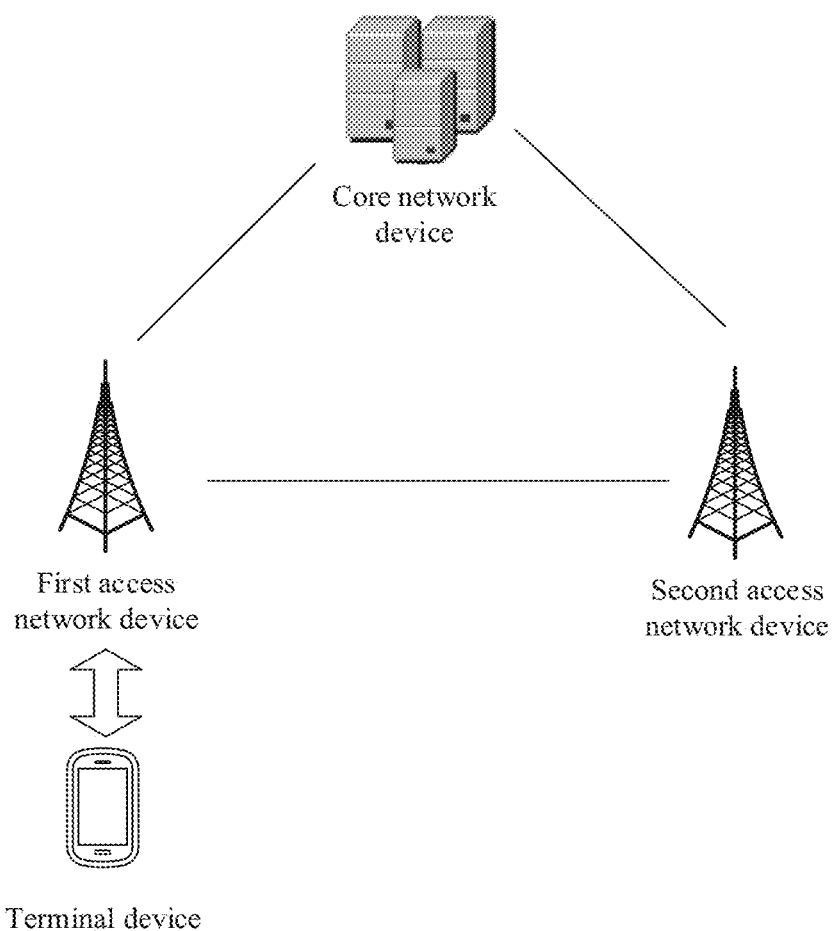
FIG. 2 is a schematic architectural diagram of a communication system according to an embodiment of this application.
Figure 3:
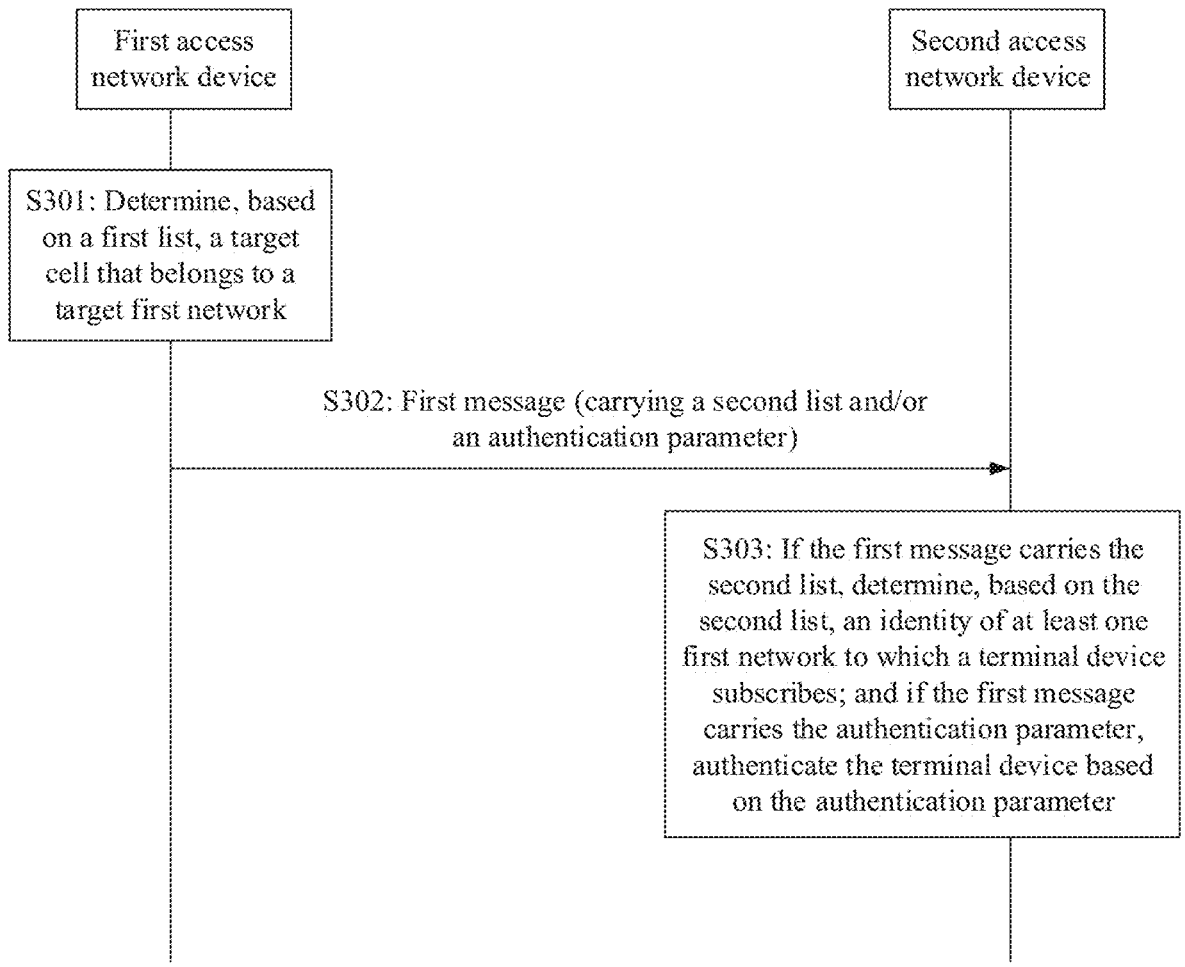
FIG. 3 is a schematic flowchart of a communication method according to an embodiment of this application.

FIG. 3 is a flowchart of a communication method according to an embodiment of this application. The communication method provided in this application may be used in the communication system shown in FIG. 2. It may be understood that the communication system architecture shown in FIG. 2 is merely an example. The communication method provided in this embodiment of the present invention is applicable to various private network deployment scenarios in which a terminal device is handed over from a source access network device to a target private network.

It should be noted that a "private network" is only an example name. A network having a "private network" function may also have another name, for example, XX. It should be understood that if the XX also has a function of the private network in the embodiments of this application, the XX may also be understood as the private network in the embodiments of this application. Similarly, a "public network" is merely an example name. A network having a public network function may also have another name, for example, XXX. It should be understood that if the XXX also has a function of the public network in the embodiments of this application, the XXX may also be understood as the public network in the embodiments of this application.

It may be understood that in the embodiments of this application, the terminal device and/or the network device may perform some or all steps in the embodiments of this application. These steps or operations are merely examples. In the embodiments of this application, another operation or variations of various operations may be further performed. In addition, the steps may be performed in a sequence different from that presented in the embodiments of this application, and not all the operations in the embodiments of this application are necessarily performed.

For ease of description, in the embodiments of this application, uniformly, a network having a private network function is referred to as a first network, and a network having a public network function is referred to as a second network. It should be understood that, herein, a name of a network is merely an example, and is not specifically limited.

The communication method provided in this embodiment of this application may be specifically as follows:

S301: A first access network device determines, based on a first list, a target cell that belongs to a target first network, where the first list includes an identity of at least one first network to which a terminal device subscribes.

The first access network device may be a source access network device accessed by the terminal device before the terminal device is handed over. In this embodiment of this application, the first access network may be an access network device that supports only the second network, or may be an access network device that supports both the first network and the second network, or may be an access network device that supports only the first network.

In this embodiment of this application, the terminal device may support only the first network, or may support the first network and the second network.

S302: The first access network device sends a first message to a second access network device that serves the target cell, where the first message is used to indicate the second access network device to prepare to hand over the terminal device to the target cell.

The first message carries a second list and/or an authentication parameter. The second list is used to enable the second access network device to determine an identity of at least one first network to which the terminal device subscribes; and the second list includes the one or more identities of the one or more first networks to which the terminal device subscribes. The second list may be determined based on the first list, and includes some identities or all identities in the first list. The authentication parameter comes from the terminal device, and the authentication parameter may be used by the second access network device to authenticate the terminal device.

In this embodiment of this application, the second access network device may be an access network device that supports the first network, and may support any first network deployment, for example, any one of the foregoing four first network deployments, or another deployment of the first network.

In this embodiment of this application, the first access network device and a first network that is covered by the second access network device support communication with each other, may directly communicate with each other, or may communicate with each other through an N3IWF interface.

In an implementation, the authentication parameter may be generated in the following manner: The second access network device sends one or more second parameters to the terminal device; and the terminal device generates the authentication parameter based on stored one or more first parameters and the obtained one or more second parameters.

Further, the terminal device may send the authentication parameter to the first access network device, and the first access network device is an access network device accessed by the terminal device.

In specific implementation, the first message may further carry first indication information, and the first indication information is used to indicate a first parameter used by the terminal device to generate the authentication parameter.

For example, the first indication information may be specific content of the first parameter, or may be an index of the first parameter, or may be information about a time at which the first parameter is received by the terminal device.

The first message may further carry a network identity of a cell served by the first access network device and accessed by the terminal device. Specifically, if the cell served by the first access network device and accessed by the terminal device is a cell of a first network, the first message carries an identity of the first network corresponding to the cell. In this way, after receiving the first message, the second access network device may determine subscription information of the terminal device when an identity of the target first network is the same as the identity of the first network corresponding to the cell.

S303: If the first message carries the second list, the second access network device determines, based on the second list, the identity of the at least one first network to which the terminal device subscribes. If the first message carries the authentication parameter, the second access network device authenticates the terminal device based on the authentication parameter.

The second access network device may determine, based on the second list, the identity of the at least one first network of the terminal device, that is, the subscription information of the terminal device, so that the second access network device may select the target cell for the terminal device based on the determined subscription information when the terminal device is subsequently handed over.

In addition, the second access network device may further send a second message to the first access network device, where the second message is used to acknowledge that the second access network device allows the terminal device to be handed over to the target cell. Correspondingly, the first access network device may receive the second message sent by the second access network device. The second message may carry an identity of the first network to which the target cell belongs.

In specific implementation, the second access network device may send the second message when the terminal device is successfully authenticated based on the authentication parameter. Alternatively, the second access network device may send the second message when the second access network device successfully authenticates the terminal device based on the authentication parameter and determines, based on a load status of the second access network device, to allow the terminal device to be handed over to the target cell. Alternatively, the second access network device may send the second message when determining, with reference to other information, to allow the terminal device to be handed over to the target cell. Examples are not listed one by one herein.

In this embodiment of this application, the source access network device determines a target cell that belongs to the target private network, based on the identity of the at least one private network to which the terminal device subscribes, so that a proper handover target can be selected for the terminal device. In addition, the second list and/or the authentication parameter are/is carried in the first message, so that a target access network device may authenticate the terminal device based on the second list and/or the authentication parameter that are/is sent by the source access network device, so as to determine reliability, validity, security, and the like of the terminal device.

In a possible implementation, the first access network device may receive the first list sent by the terminal device. Specifically, the first access network device may receive the subscription information sent by the terminal device, and determine the first list based on the subscription information.

In another possible implementation, the first access network device may alternatively receive the first list sent by a core network device. In specific implementation, the first access network device may receive an initial context setup request message or a path switch request acknowledge message sent by the core network device, where the initial context setup request message or the path switch request acknowledge message carries the first list. Optionally, before the first access network device receives the first list sent by the core network device, the first access network device may further send second indication information to the core network device. The second indication information is used to indicate the core network device whether to send the identities of the one or more first networks to which the terminal device subscribes. If the second indication information indicates the core network device to send the identities of the one or more first networks to which the terminal device subscribes, the core network device may send, to the second access network device, the identities of the one or more first networks to which the terminal device subscribes. For example, the core network device may send the initial context setup request message or the path switch request acknowledge message, where the initial context setup request message or the path switch request acknowledge message carries the first list. In an implementation, a function of the second indication information may be alternatively implicitly implemented. For example, whether an information element is carried is used to indicate the core network device whether to send the identities of the one or more first networks to which the terminal device subscribes.

In this implementation, the core network device may receive a third list sent by the first access network device, where the third list is determined based on the subscription information received by the access network device from the terminal device, and the third list includes the identities of the one or more first networks to which the terminal device subscribes. Alternatively, the core network device may determine a fourth list based on the subscription information of the terminal device that is stored in a CN, where the fourth list includes the identities of the one or more first networks to which the terminal device subscribes. The core network device sends the fourth list to an access network device.

It should be noted that in this embodiment of this application, the first list, the second list, the third list, and the fourth list may be the same or may be different.

The first access network device may further receive first information sent by the second access network device, where the first information includes at least one of the following information: an identity of a first network covered by the second access network device (for example, CAG ID information or NPN ID information of a cell of the first network covered by the second access network device), an identity of a second network that supports communication with the second access network device (for example, an identity of a second network that supports communication with the second access network device through an N3IWF when the second access network device belongs to the first network), or an identity of a first network that supports communication with the second access network device (for example, an identity of a first network that supports communication with the second access network device through an N3IWF when the second access network device belongs to the second network). Further, the first information may further include at least one of the following information: information about a cell corresponding to a first network that supports communication with a second network and that is covered by the second access network device, or information about a cell corresponding to a second network that supports communication with a first network and that is covered by the second access network device.

In addition, the first information may further include at least one of the following information: an identity of a first network covered by a neighboring access network device of the second access network device, an identity of a second network supporting communication with a neighboring access network device, an identity of a first network supporting communication with a neighboring access network device, cell information corresponding to a first network that supports communication with a second network and that is covered by a neighboring access network device, or cell information corresponding to a second network that supports communication with a first network that is covered by a neighboring access network device.

Further, when the first access network device determines, based on the first list, the target cell that belongs to the target first network, the first access network device may determine, based on the first list and the first information, the target cell that belongs to the target first network.

The first access network device may further send second information to second access network device, where the second information includes at least one of the following information: an identity of a first network covered by the first access network device (for example, CAG ID information or NPN ID information of a cell of the first network covered by the first access network device), an identity of a second network that supports communication with the first access network device, an identity of a first network that supports communication with the first access network device, cell information corresponding to a first network that supports communication with a second network and that is covered by the first access network device, or cell information corresponding to a second network that supports communication with a first network that is covered by the first access network device.

In addition, the second information may further include the following information: an identity of a first network covered by a neighboring access network device of the first access network device, an identity of a second network supporting communication with a neighboring access network device, an identity of a first network supporting communication with a neighboring access network device, cell information corresponding to a first network that supports communication with a second network and that is covered by a neighboring access network device, or cell information corresponding to a second network that supports communication with a first network that is covered by a neighboring access network device.

Therefore, during subsequent handover of the terminal device, the second access network device may determine the target cell with reference to the second information.

Figure 4:
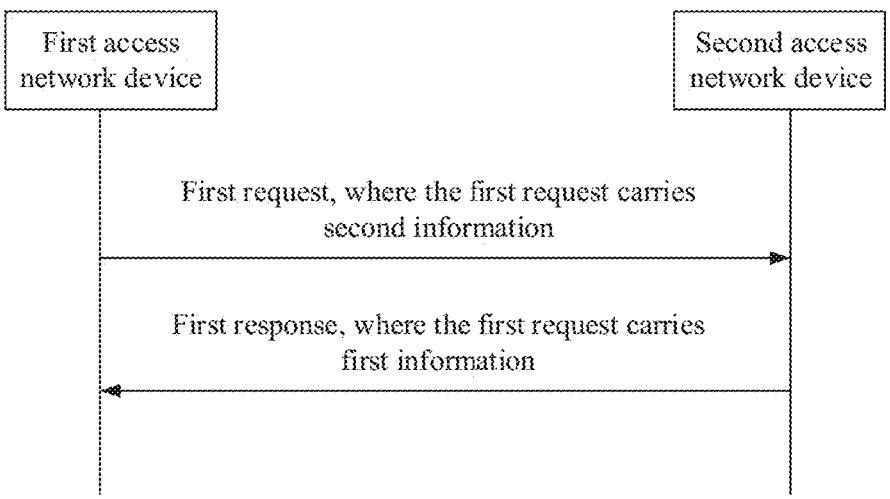
FIG. 4 is a schematic flowchart of exchanging first information and second information according to an embodiment of this application.

In specific implementation, the first access network device and the second access network device may exchange the first information and the second information in any one of the following manners:

Manner 1: The first access network device sends a first request to the second access network device, where the first request carries the second information. Then, the second access network device sends a first response to the first access network device, where the first response carries the first information. This manner is as shown in FIG. 4.

Manner 2: The second access network device sends a first request to the first access network device, where the first request carries the first information. Then, the first access network device sends a first response to the second access network device, where the first response carries the second information.

For example, the first request may be an Xn setup request message, and the first response may be an Xn setup response message. Alternatively, the first request may be a configuration update message, and the first response may be a configuration update acknowledge message.

In addition, the first access network device may further send second neighboring cell information to the terminal device. Optionally, the second neighboring cell information may be determined based on the second information. The second access network device may alternatively send first neighboring cell information to the terminal device. Optionally, the first neighboring cell information may be determined based on the first information. For example, the first neighboring cell information or the second neighboring cell information may be sent to the terminal device through a system message, or the first neighboring cell information or the second neighboring cell information may be sent to the terminal device based on a request of the terminal device.

It should be noted that a process of exchanging the first information and the second information between the first access network device and the second network access device may alternatively be implemented as a separate solution.

Before step S301, the core network device may first determine that the terminal device supports a first network. In specific implementation, when the terminal device accesses the first access network device, the core network device may identify that the terminal device supports the first network.

To better understand this embodiment of this application, with reference to a specific application scenario, the following specifically describes in detail a process of mobility, of the terminal device, between first networks by using an example in which the first access network device supports only a second network and the second access network device supports a first network.

Figure 5:
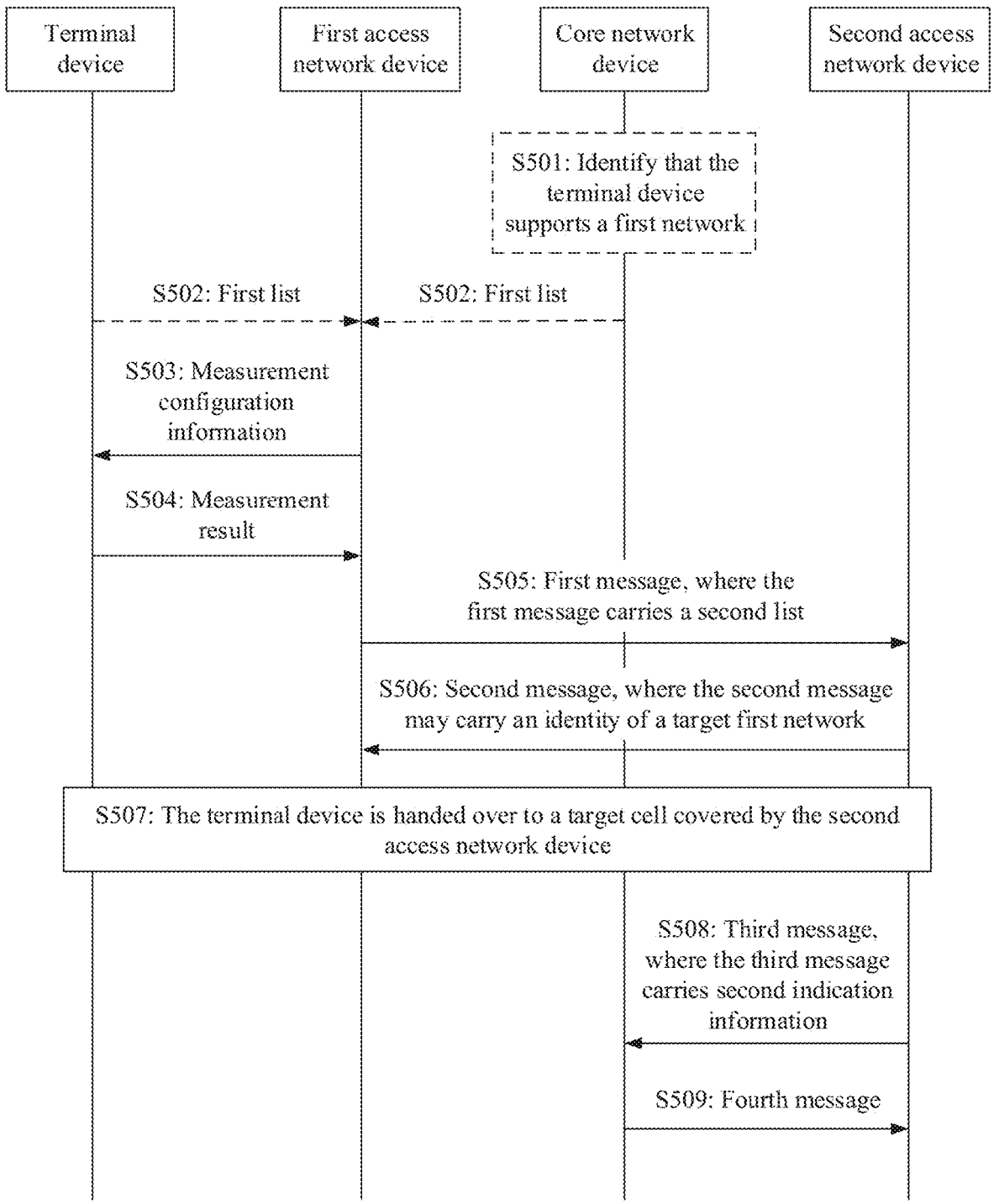
FIG. 5 is a schematic diagram of a process of mobility, of a terminal device, between first networks according to an embodiment of this application.

In an embodiment, a process of mobility, of a terminal device, between first networks may be shown in FIG. 5, and includes the following steps.

Optionally, in S501, a core network device identifies that the terminal device supports a first network.

In a possible implementation, the core network device may identify, based on subscription information of the terminal device stored in a CN, that the terminal device supports the first network.

In another possible implementation, the core network device may alternatively determine, based on a capability of the terminal device, that the terminal device supports the first network.

Alternatively, the terminal device may actively send a list of first networks supported by the terminal device to a first access network device, and the first access network device forwards the list to the core network device, to trigger the core network device to authenticate the terminal device.

Alternatively, the terminal device may actively send information (for example, capability information, or information indicating that the first network is supported) about a first network supported by the terminal device to a first access network device, and the first access network device sends the indication information to the core network device, to trigger the core network device to authenticate the terminal device or send an identity of the first network to which the terminal device subscribes.

S502: The first access network device receives the first list. Specifically, the first access network device receives the first list sent by the terminal device or the core network device.

The core network device may directly send the first list to the first access network device when the terminal device performs access. Alternatively, the core network device may send the first list to the first access network device after authentication of the first network succeeds. Alternatively, the core network device may send the first list to the first access network device after receiving indication information sent by the first access network device, where the indication information is used to indicate whether the core network device sends the identity of the first network to which the terminal device subscribes.

In specific implementation, the core network device may send the first list to the first access network device through an initial context setup request message. Further, after receiving the initial context setup request message, the first access network device may send an initial context setup response to the core network device.

S503: The first access network device sends measurement configuration information to the terminal device, where the measurement configuration information includes information about one or more cells or frequencies, and the measurement configuration information is used to indicate the terminal device to measure the one or more cells or frequencies specified in the measurement configuration information.

Optionally, the measurement configuration information may include information about at least one cell or frequency corresponding to the first network. Specifically, the measurement configuration information may include an identity of a first network and information about at least one cell or frequency corresponding to the identity of the first network.

S504: The terminal device sends a measurement result to the first access network device.

Optionally, the measurement result may include the identity of the first network.

S505: The first access network device sends a first message to a second access network device, where the first message is used to indicate the second access network device to prepare to hand over the terminal device to a target cell, and the first message carries a second list.

For example, the first access network device may determine the target cell served by the second access network device, based on the identity of the first network to which the terminal device subscribes, the identity of the first network in the measurement result reported by the terminal device, and the identity of the first network supported (directly or through an N3IWF) by the second access network device The identity of the first network supported (directly or through the N3IWF) by the second access network device may be determined by the first access network device based on first information.

The second list is used to enable the second access network device to determine the identity of the at least one first network to which the terminal device subscribes; and the second list includes the one or more identities of the one or more first networks to which the terminal device subscribes. The second list may be determined based on the first list, and includes the some identities or all identities in the first list.

For example, the second list may be the first list; the second list may be an identity that is in the first list and that is of an authenticated first network; the second list may be an identity that is in the first list and that is of an authenticated first network supported (directly or through the N3IWF) by the second access network device; the second list may be an identity that is in the first list and that is of a first network device supporting communication with the first access network device; the second list may be an identity that is in the first list and that is of an authenticated first network device supporting communication with the first access network device; the second list may be an identity that is in the first list, that is included in the measurement result sent by the terminal device, and that is of a first network supported (directly or through the N3IWF) by the second access network device; or the like. Examples are not listed one by one herein.

S506: The second access network device sends the second message to the first access network device, where the second message is used to acknowledge that the second access network device allows the terminal device to be handed over to the target cell.

The second message may carry an identity of a target first network.

Further, the first access network device may send the identity of the target first network to the terminal device. In a possible implementation, the first access network device may send the identity of the target first network to the terminal device through an RRC reconfiguration message. The identity of the target first network is used by the terminal device to determine the target first network to be accessed in the target cell. For example, when the target cell sends one or more identities of one or more first networks, the terminal device may determine, based on the received identity of the target first network, the target first network to be accessed in the target cell.

S507: The terminal device is handed over to the target cell covered by the second access network device.

The terminal device may determine, based on the received identity of the target first network, the target first network to be accessed in the target cell, and be handed over to the target cell covered by the second access network device.

S508: The second access network device sends a third message to the core network device, where the third message is used to indicate the core network device to perform path switching.

Optionally, the third message may carry second indication information, where the second indication information is used to indicate whether the core network device sends the identities of the one or more first networks to which the terminal device subscribes. In an implementation, a function of the second indication information may be further implicitly implemented. For example, whether an information element is carried is used to indicate whether the core network device needs the identities of the one or more first networks to which the terminal device subscribes.

S509: The core network device sends a fourth message to the second access network device, where the fourth message is used to acknowledge that the core network device has completed the path switching.

If the indication information carried in the third message indicates the core network device to send the identities of the one or more first networks to which the terminal device subscribes, the fourth message carries a fourth list, where the fourth list includes the identities of the one or more first networks to which the terminal device subscribes.

If the indication information carried in the third message indicates the core network device not to send the identities of the one or more first networks to which the terminal device subscribes, the fourth message does not carry the fourth list.

Figure 6A:
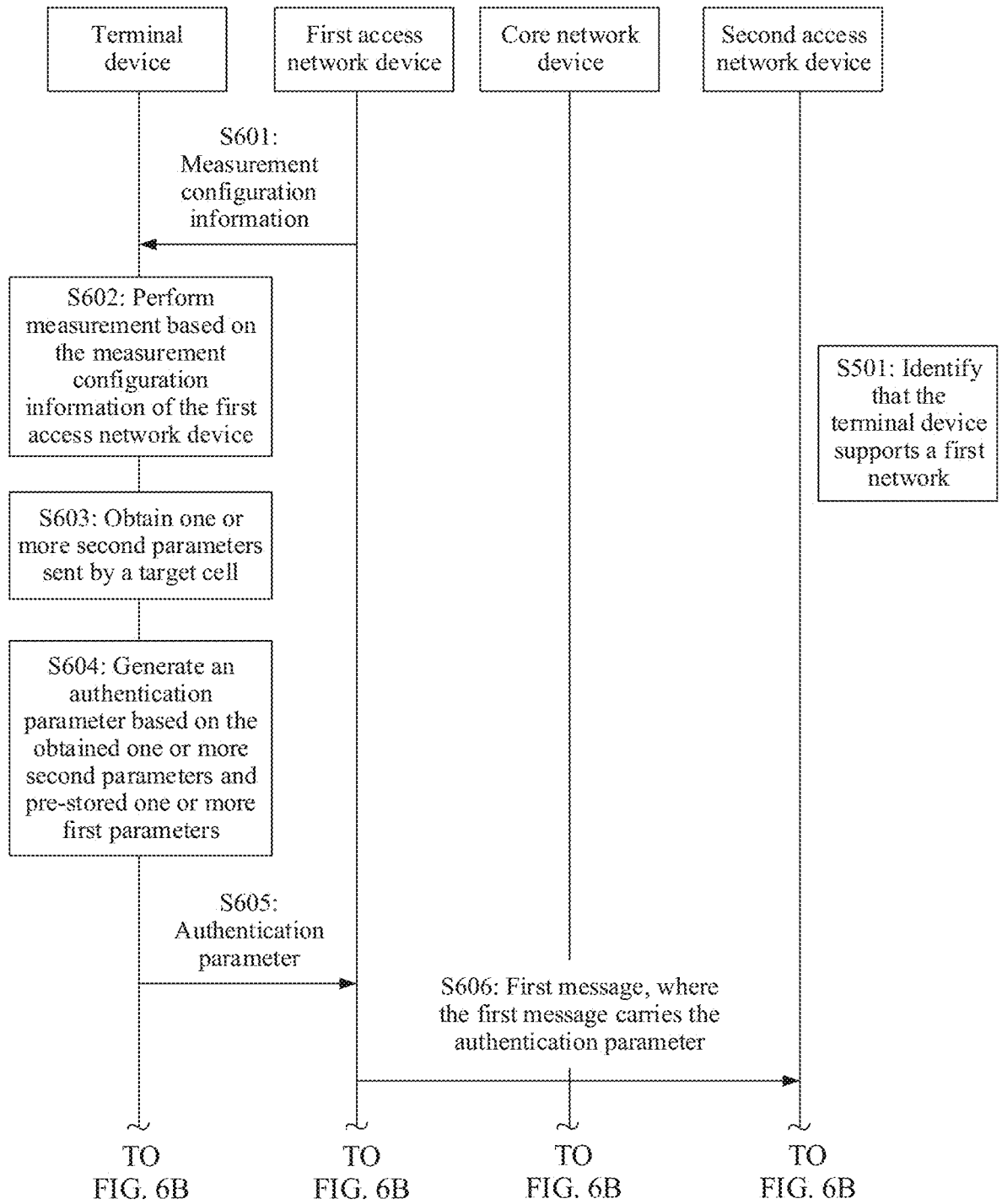
FIG. 6A and FIG. 6B are a schematic diagram of another process of mobility, of a terminal device, between first networks according to an embodiment of this application.
Figure 6B:
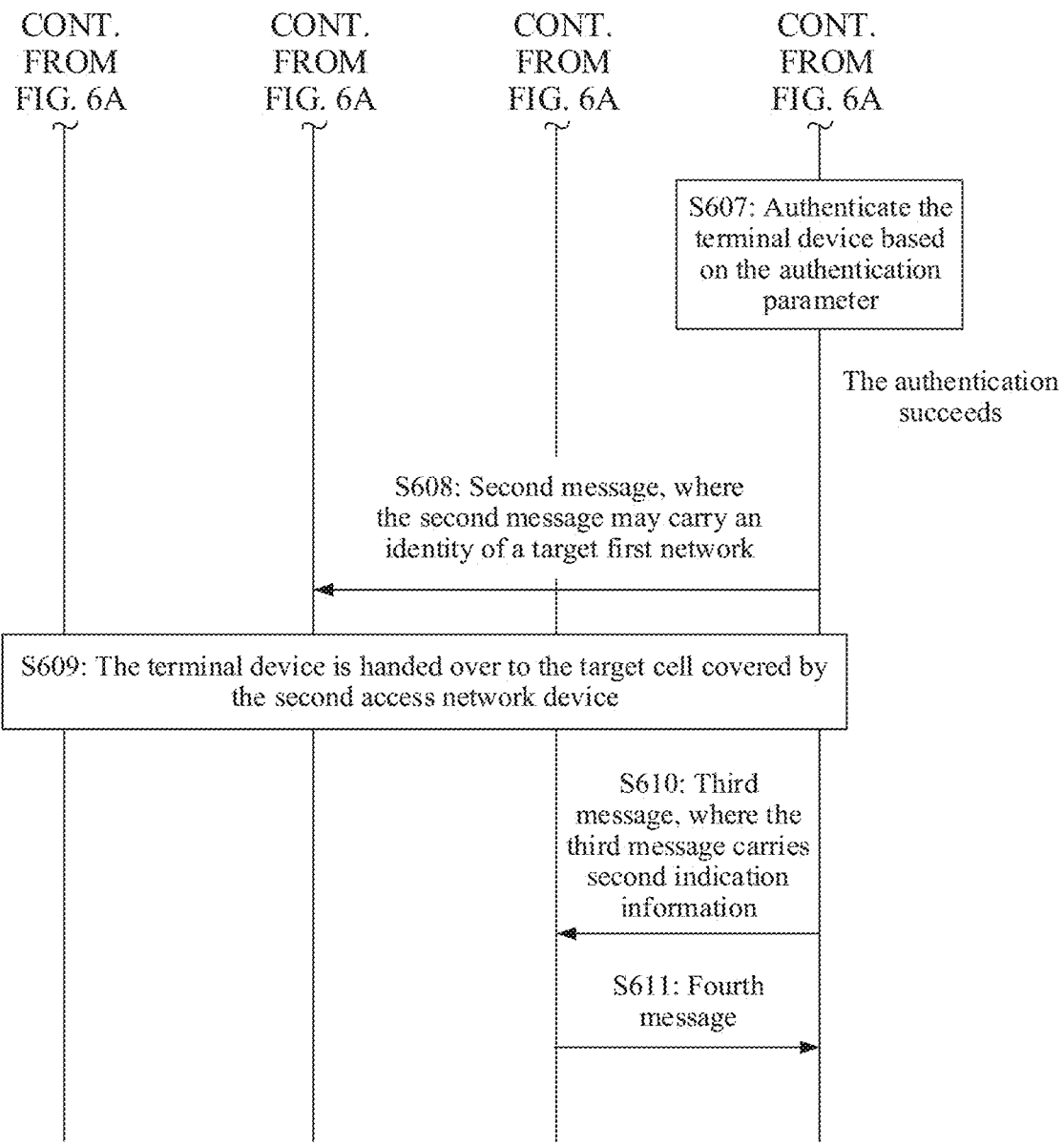

In another embodiment, a process of mobility, of a terminal device, between first networks may be shown in FIG. 6A and FIG. 6B, and includes the following steps.

S601: A first access network device sends measurement configuration information to the terminal device, where the measurement configuration information includes an identity of at least one first network and/or includes information about a cell or a frequency corresponding to the identity of the at least one first network.

S602: The terminal device performs measurement based on the measurement configuration information of the first access network device.

Optionally, if the terminal device detects a target cell that meets a condition, the terminal device may further read a system message of the target cell, to obtain an identity of a first network corresponding to the target cell.

S603: The terminal device obtains one or more second parameters sent by the target cell.

For example, the terminal device may obtain the one or more second parameters in the system message sent by the target cell; or the terminal device may initiate a request message, to request the target cell to send the one or more second parameters.

S604: The terminal device generates an authentication parameter based on the obtained one or more second parameters and pre-stored one or more first parameters.

Optionally, the authentication parameter may be at a cell level, or may be at an NPN ID level.

The one or more first parameters may be preconfigured by the terminal device, or the one or more first parameters may be received and stored by the terminal device when the terminal device previously accesses the first network.

S605: The terminal device sends the authentication parameter to the first access network device.

In specific implementation, the terminal device may send a measurement result to the first access network, where the measurement result carries the authentication parameter. In addition, the measurement result may further carry first indication information, where the first indication information is used to indicate the first parameter used by the terminal device to generate the authentication parameter.

For example, the first indication information may be specific content of the first parameter, or may be an index of the first parameter, or may be information about a time at which the first parameter is received by the terminal device.

S606: The first access network device sends a first message to a second access network device, where the first message is used to indicate the second access network device to prepare to hand over the terminal device to the target cell, and the first message carries the authentication parameter.

In addition, the first message may also carry the first indication information.

S607: The second access network device authenticates the terminal device based on the authentication parameter.

If the authentication succeeds, step S608 is performed.

S608: The second access network device sends a second message to the first access network device, where the second message is used to acknowledge that the second access network device allows the terminal device to be handed over to the target cell.

The second message may carry the identity of the target first network.

Further, the first access network device may send the identity of the target first network to the terminal device. In a possible implementation, the first access network device may send the identity of the target first network to the terminal device through an RRC reconfiguration message. The identity of the target first network is used by the terminal device to determine the target first network to be accessed in the target cell. For example, when the target cell sends one or more identities of one or more first networks, the terminal device may determine, based on the received identity of the target first network, the target first network to be accessed in the target cell.

S609: The terminal device is handed over to the target cell covered by the second access network device.

The terminal device may determine, based on the received identity of the target first network, the target first network to be accessed in the target cell, and be handed over to the target cell covered by the second access network device.

S610: The second access network device sends a third message to the core network device, where the third information is used to indicate the core network device to perform path switching.

S611: The core network device sends a fourth message to the second access network device, where the fourth message is used to acknowledge that the core network device has completed the path switching.

For specific descriptions of S608 to S611, respectively refer to the descriptions of S506 to S509. Details are not described herein.

In this embodiment of this application, FIG. 4, FIG. 5, and FIG. 6A and FIG. 6B may each be implemented as one solution, or may be implemented in combination. For example, any two of FIG. 4 to FIG. 6A and FIG. 6B are combined as one solution for implementation, or FIG. 4 to FIG. 6A and FIG. 6B are combined as one solution for implementation.

In a communication system, a terminal device has a radio resource control (RRC) connected state (RRC_connected), an RRC idle state (RRC_idle), and a non-activated mode or a deactivated mode (inactive). An inactive terminal device may have at least one of the following features:

(1) When the terminal device enters the inactive state, the terminal device and an access network device that configures the terminal device to enter the inactive state retain access stratum context information of the UE.

For ease of description, in this embodiment of this application, the access network device that configures the terminal device to enter the inactive state is referred to as an anchor access network device.

(2) The anchor access network device maintains connections between the terminal device and a control plane and a user plane of the core network device. The anchor access network device allocates a radio-access-network (radio access network, RAN)-based notification area (RNA) to the terminal device. The terminal device performs only periodic RNA update (RNAU) in the RNA. After the terminal device moves out of the RNA, the terminal device performs mobility-triggered RNAU.

(3) The anchor access network device allocates an inactive radio network temporary identifier (I-RNTI) to the terminal device, where the I-RNTI may be used to identify the anchor access network device, and uniquely identify the terminal device in the anchor access network device.

(4) The terminal device performs cell reselection.

(5) There may be three types of discontinuous reception (discontinuous, DRX) of the inactive terminal device: DRX that is broadcast through a cell system message, DRX configured by a CN, and RAN DRX configured for the terminal device by the anchor access network device. The terminal device monitors a paging message based on a minimum DRX length.

The anchor access network device of the inactive terminal device maintains connections to the control plane and the user plane of the core network device. Therefore, when downlink data of the terminal device arrives, the core network device directly sends the data to the anchor access network device. In this case, the anchor access network device needs to page the terminal device in the entire RNA. Therefore, RAN-based paging needs to be introduced to implement a paging function triggered by an access network device. When an access network device in the RNA sends a paging message over an air interface to page the terminal device, only the I-RNTI allocated by the anchor access network device to the UE needs to be carried.

When the terminal device responds to the paging or initiates access under another access network device, the terminal device sends the I-RNTI to the another access network device. The another access network device may identify the anchor access network device based on the I-RNTI, and obtain context information, of the terminal device, on the anchor access network device. Therefore, when sending an msg4, the another access network device may configure the terminal device to enter the connected state, so that a delay for the terminal device to enter the connected state can be greatly shortened, and air interface signaling overheads are reduced.

Figure 7:
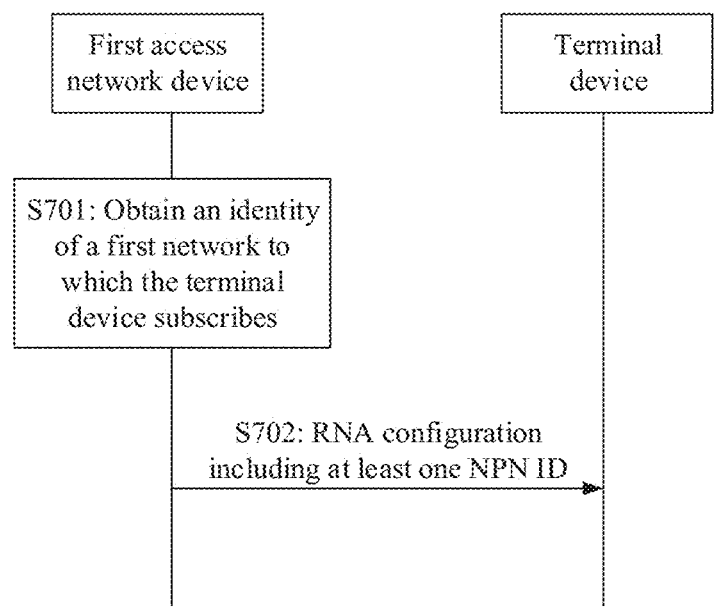
FIG. 7 is a schematic flowchart of another communication method according to an embodiment of this application.

Introduction of the inactive state may also be considered in a first network scenario, so as to further reduce energy consumption of the UE and support fast mode transition. Based on this, an embodiment of this application provides a communication method for adaptive modification of configuration information related to the inactive state, so as to support the first network scenario. FIG. 7 is a flowchart of a communication method according to an embodiment of this application. The communication method provided in this application may be used in the communication system shown in FIG. 2. The communication method provided in this embodiment of the present invention is applicable to various private network deployment scenarios in which a terminal device is handed over from a source access network device to a target private network.

The communication method provided in this embodiment of this application may be specifically as follows:

S701: A first access network device obtains an identity of a first network to which a terminal device subscribes.

The first access network device may obtain the identity of the first network to which the terminal device subscribes from a core network device, the terminal device, or another access network device. This is not limited in this embodiment. Optionally, for a specific obtaining manner, refer to descriptions in another embodiment of this application.

S702: The first access network device sends an RNA configuration including at least one NPN ID to the terminal device.

When the first access network device configures the terminal device to enter an inactive state, the first access network device sends the RNA configuration including the at least one NPN ID, to indicate a notification area of the first network to the terminal device.

Optionally, the first access network device may further send a RAN paging message to a second access network device, where the RAN paging message carries at least one NPN ID, to indicate that the second access network device needs to page the terminal device only in a cell corresponding to the NPN ID.

The second access network device may be any access network device in the RNA configuration of the terminal device.

For example, when downlink data or signaling of the terminal device arrives at the first access network device, the first access network device may initiate RAN paging to another access network device in the RNA, where the RAN paging message carries at least one NPN ID.

In addition, the first access network device may further send context information of the terminal device to a third access network device. The context information of the terminal includes the RNA configuration that includes the at least one NPN ID and that is configured by the first access network device for the terminal device.

The third access network device may be any access network device in the RNA configuration of the terminal device. It may be understood that the second access network device and the third access network device may be a same access network device, or may be different access network devices.

For example, when the terminal device initiates an access request to a new access network device different from the first access network device, the new access network device may send a request message to the first access network device, where the request message is used to request the context information of the terminal device. If the first access network device determines to forward the context information of the terminal device, the first access network device sends the context information of the terminal device to the new access network device, where the context information of the terminal device includes the RNA configuration that includes at least one NPN ID and that is configured by the first access network device for the terminal device.

In the embodiments of this application, the communication method shown in FIG. 3 and the communication method shown in FIG. 7 may each be implemented as one solution, or may be implemented in combination as one solution.

Figure 8:
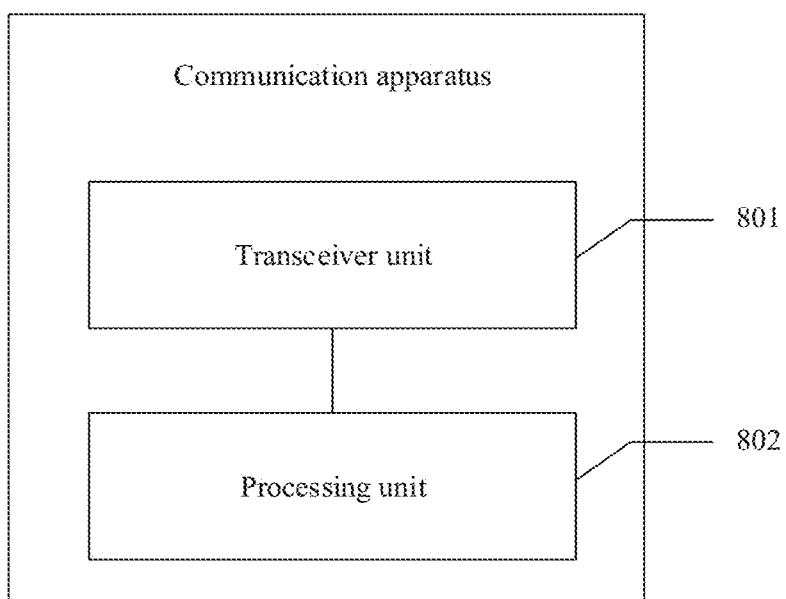
FIG. 8 is a schematic structural diagram of a communication apparatus according to an embodiment of this application.

Based on a same invention concept as that of the method embodiments, an embodiment of this application provides a communication apparatus. A structure of the apparatus may be shown in FIG. 8, and includes a transceiver unit 801, and may further include a processing unit 802.

In a specific implementation, the communication apparatus may be specifically configured to implement the method performed by the first access network device in the embodiment in FIG. 3. The apparatus may be the first access network device, or may be a chip, a chip set, or a part of a chip, where the chip and the chip set are in the first access network device, and the part of the chip is configured to perform a function of a related method. The processing unit 802 is configured to determine, based on a first list, a target cell that belongs to a target first network, where the first list includes an identity of at least one first network to which a terminal device subscribes. The transceiver unit 801 is configured to send a first message to a second access network device that serves the target cell, where the first message is used to indicate the second access network device to prepare to hand over the terminal device to the target cell, the first message carries a second list and/or an authentication parameter, the second list is used to enable the second access network device to determine the identity of the at least one first network to which the terminal device subscribes, the authentication parameter is from the terminal device, and the authentication parameter is used to enable the second access network device to authenticate the terminal device.

The transceiver unit 801 may be further configured to receive the first list sent by the terminal device.

The transceiver unit 801 may be further configured to receive the first list sent by a core network device.

The transceiver unit 801 may be further configured to receive first information sent by the second access network device, where the first information includes at least one of the following information: an identity of a first network covered by the second access network device, an identity of a second network that supports communication with the second access network device, an identity of a first network that supports communication with the second access network device, information about a cell corresponding to a first network that supports communication with a second network and that is covered by the second access network device, or information about a cell corresponding to a second network that supports communication with a first network and that is covered by the second access network device. When determining, based on the first list, the target cell that belongs to the target first network, the processing unit 802 may be specifically configured to determine, based on the first list and the first information, the target cell that belongs to the target first network. For example, the first message may further carry indication information, the indication information is used to indicate a first parameter used by the terminal device to generate the authentication parameter, and the first parameter is a parameter that is pre-stored in the terminal device and used to generate the authentication parameter.

The transceiver unit 801 may be further configured to receive a second message sent by the second access network device, where the second message is used to acknowledge that the second access network device allows the terminal device to be handed over to the target cell, and the second message carries an identity of the first network to which the target cell belongs.

Optionally, the transceiver unit 801 may be further configured to send the identity of the target first network to the terminal device.

In another specific implementation, the communication apparatus may be specifically configured to implement the method performed by the second access network device in the embodiment in FIG. 3. The apparatus may be the second access network device, or may be a chip, a chip set, or a part of a chip, where the chip and the chip set are in the second access network device, and the part of the chip is configured to perform a function of a related method. The transceiver unit 801 is configured to receive the first message sent by the first access network device, where the first message is used to indicate the second access network device to prepare to hand over the terminal device to the target cell. The first message carries a second list and/or an authentication parameter, the second list includes one or more identities of one or more first networks to which the terminal device subscribes, the second list is used to enable the second access network device to determine the identity of the at least one first network to which the terminal device subscribes, and the authentication parameter is used to enable the second access network device to authenticate the terminal device. The processing unit 802 is configured to: when the first message carries the second list, determine, based on the second list, the identity of the at least one first network to which the terminal device subscribes; and/or when the first message carries the authentication parameter, authenticate the terminal device based on the authentication parameter.

The transceiver unit 801 may be further configured to send the second message to the first access network device, where the second message is used to acknowledge that the second access network device allows the terminal device to be handed over to the target cell. For example, the second message carries the identity of the first network to which the target cell belongs.

The transceiver unit 801 may be further configured to send a third message to the core network device, where the third information is used to indicate the core network device to perform path switching, the third message carries indication information, and the indication information is used to indicate whether the core network device sends the identities of the one or more first networks to which the terminal device subscribes.

The transceiver unit 801 may be further configured to receive a fourth message sent by the core network device, where the fourth message is used to acknowledge that the core network device has completed the path switching, the fourth message carries a fourth list, and the fourth list includes the identities of the one or more first networks to which the terminal device subscribes.

The transceiver unit 801 may be further configured to send one or more second parameters to the terminal device, where the one or more second parameters are used to generate the authentication parameter.

For example, the first message may further carry indication information, the indication information is used to indicate one or more first parameters used by the terminal device to generate the authentication parameter, and the first parameter is a parameter that is pre-stored in the terminal device and used to generate the authentication parameter.

In another specific implementation, the communication apparatus may be specifically configured to implement the method performed by the core network device in the embodiment in FIG. 3. The apparatus may be the core network device, or may be a chip, a chip set, or a part of a chip, where the chip and the chip set are in the core network device, and the part of the chip is configured to perform a function of a related method. The processing unit 802 is configured to determine the identities of the one or more first networks to which the terminal device subscribes. The transceiver unit 801 is configured to send the first list to an access network device, where the first list includes the identities of the one or more first networks to which the terminal device subscribes.

For example, the transceiver unit 801 may be specifically configured to send an initial context setup request message or a path switch request acknowledge message to the access network device, where the initial context setup request message or the path switch request acknowledge message carries the first list.

The processing unit 802 may be further configured to: before determining the identities of the one or more first networks to which the terminal device subscribes, determine that the terminal device supports the first network.

The transceiver unit 801 may be further configured to receive indication information sent by the access network device, where the indication information is used to indicate the core network device to send, to the access network device, the identities of the one or more first networks to which the terminal device subscribes.

The transceiver unit 801 may be further configured to receive a third list sent by the access network device, where the third list is determined based on subscription information received by the access network device from the terminal device.

In another specific implementation, the communication apparatus may be specifically configured to implement the method performed by the terminal device in the embodiment in FIG. 3. The apparatus may be the terminal device, or may be a chip, a chip set, or a part of a chip, where the chip and the chip set are in the terminal device, and the part of the chip is configured to perform a function of a related method. The transceiver unit 801 is configured to obtain one or more second parameters sent by the second access network device that serves the target cell corresponding to the target first network. The processing unit 802 is configured to generate an authentication parameter based on stored one or more first parameters and the obtained one or more second parameters, where the authentication parameter is used to enable the second access network device to authenticate the terminal device. The transceiver unit 801 is further configured to send the authentication parameter to the first access network device, where the first access network device is an access network device accessed by the terminal device.

The transceiver unit 801 may be further configured to send indication information to the first access network device, where the indication information is used to indicate the first parameter used by the terminal device to generate the authentication parameter.

Optionally, the transceiver unit 801 may be further configured to receive the identity of the target first network from the first access network device. Therefore, the communication apparatus may determine, based on the received identity of the target first network, the target first network to be accessed in the target cell, and be handed over to the target cell covered by the second access network device.

Division into modules in the embodiments of this application is an example, is only logical function division, and may be other division in actual implementation. In addition, function modules in the embodiments of this application may be integrated into one processor, or may exist alone physically, or two or more modules may be integrated into one module. The integrated module may be implemented in a form of hardware, or may be implemented in a form of a software function module. It may be understood that, for functions or implementations of the modules in the embodiments of this application, further refer to related descriptions in the method embodiments.

Figure 9:
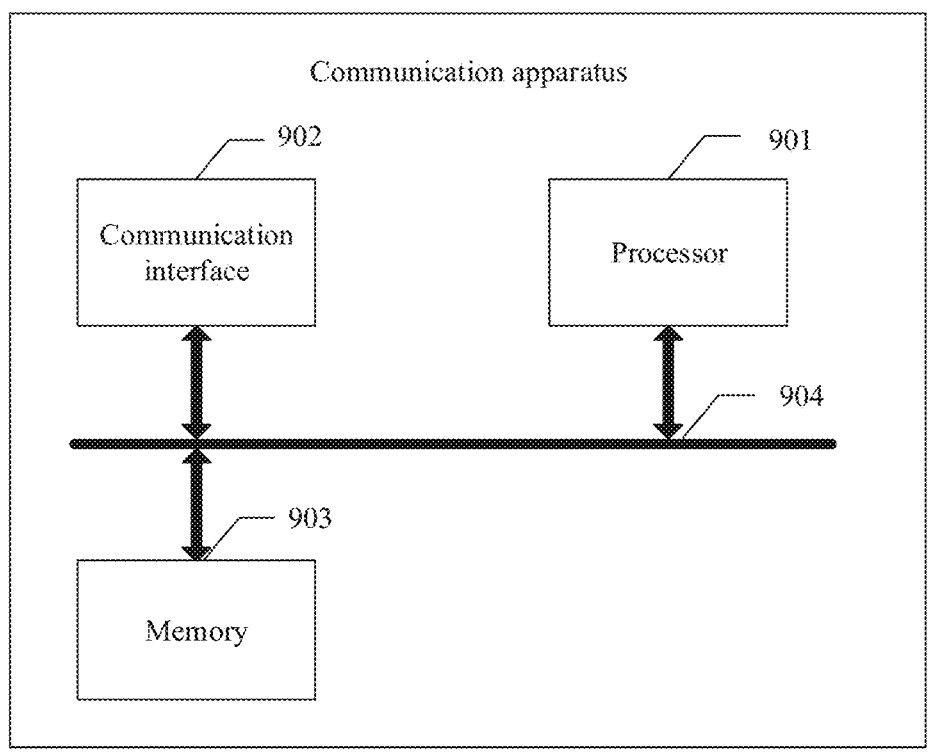
FIG. 9 is a schematic structural diagram of a communication apparatus according to an embodiment of this application.

In a possible implementation, the communication apparatus may be shown in FIG. 9. The apparatus may be a first access network device, or may be a chip in a first access network device; or may be a second access network device, or may be a chip in a second access network device; or may be a core network device, or may be a chip in a core network device; or may be a terminal device, or may be a chip in a terminal device. The communication apparatus may include a processor 901, a communication interface 902, and a memory 903. The processing unit 802 may be the processor 901. The transceiver unit 801 may be the communication interface 902.

The processor 901 may be a central processing unit (central processing unit, CPU), a digital processing module, or the like. The communication interface 902 may be a transceiver, an interface circuit such as a transceiver circuit, a transceiver chip, or the like. The communication apparatus further includes a memory 903, configured to store a program to be executed by the processor 901. The memory 903 may be a nonvolatile memory, for example, a hard disk (hard disk drive, HDD) or a solid-state drive (SSD), or may be a volatile memory, for example, a random access memory (random-access memory, RAM). The memory 903 is any other medium that can be configured to carry or store expected program code that has an instruction or a data structure form and that can be accessed by a computer, but is not limited thereto.

The processor 901 is configured to execute the program code stored in the memory 903, and is specifically configured to perform an action of the processing unit 802. Details are not described in this application again.

In this embodiment of this application, a specific connection medium between the communication interface 902, the processor 901, and the memory 903 is not limited. In this embodiment of this application, the memory 903, the processor 901, and the communication interface 902 are connected by using a bus 904 in FIG. 9, and the bus is represented by a thick line in FIG. 9. A connection manner between other components is merely schematically described, and is not limited thereto. The bus may be classified into an address bus, a data bus, a control bus, and the like. For ease of representation, only one thick line is used to represent the bus in FIG. 9, but this does not mean that there is only one bus or only one type of bus.

An embodiment of the present invention further provides a computer-readable storage medium, configured to store computer software instructions that need to be executed by the foregoing processor. The computer software instructions include a program that needs to be executed by the foregoing processor.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconducting medium (for example, a solid-state drive (Solid State Disk, SSD)), or the like.

This application is described with reference to the flowcharts and/or the block diagrams of the method, the device (system), and the computer program product according to this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or the processor of the another programmable data processing device generate an apparatus for implementing a specific function in one or more procedures in the flowcharts and/or in one or more blocks in the block diagrams.

The computer program instructions may be stored in a computer-readable memory that can indicate the computer or the another programmable data processing device to work in a specific manner, so that the instructions stored in the computer-readable memory generate an artifact that includes an instruction apparatus. The instruction apparatus implements the specific function in one or more procedures in the flowcharts and/or in one or more blocks in the block diagrams.

The computer program instructions may be loaded onto the computer or the another programmable data processing device, so that a series of operations and steps are performed on the computer or the another programmable device, thereby generating computer-implemented processing. Therefore, the instructions executed on the computer or the another programmable device provide a step for implementing the specific function in one or more procedures in the flowcharts and/or in one or more blocks in the block diagrams.

It is clear that a person skilled in the art can make various modifications and variations to this application without departing from the scope of this application. This application is intended to cover these modifications and variations of this application provided that they fall within the scope of the following claims of this application and their equivalent technologies.

What is claimed is:

1. A communication method, comprising:
   determining, by a first access network device based on a first list, a target cell that belongs to a target first network, wherein the first list comprises an identity of at least one first network to which a terminal device connected to the first access network subscribes, the identity of the at least one first network to which the terminal device subscribes being included in the first list indicates that the terminal device subscribes to the at least one first network, and the at least one first network is a private network, the target first network being one of the at least one first network; and
   sending, by the first access network device, a first message to a second access network device to which the target cell belongs, wherein the first message indicates to the second access network device to prepare for the terminal device to be handed over from the first access network device to the target cell, the first message carries a second list, and the second list enables the second access network device to determine the identity of the at least one first network to which the terminal device subscribes, and wherein the second list includes some or all identities in the first list.

2. The method according to claim 1, wherein the method further comprises:
   receiving, by the first access network device, the first list from a core network device.

3. The method according to claim 2, wherein the method further comprises:
   sending, by the first access network device to the core network device, information indicating whether the first access network device requests the identity of the at least one first network to which the terminal device subscribes.

4. The method according to claim 1, wherein the method further comprises:
   receiving, by the first access network device, first information from the second access network device, wherein the first information comprises at least one of following information: an identity of a private network covered by the second access network device, an identity of a public network that supports communication with the second access network device, an identity of a private network that supports communication with the second access network device, information about a cell corresponding to a private network that supports communication with a public network and that is covered by the second access network device, information about a cell corresponding to a public network that supports communication with a private network and that is covered by the second access network device, or an identity of a private network covered by a neighboring access network device of the second access network device; and
   determining, by the first access network device based on the first list, the target cell that belongs to the target first network comprises:
   determining, by the first access network device based on the first list and the first information, the target cell that belongs to the target first network.

5. The method according to claim 1, wherein the method further comprises:
   receiving, by the first access network device, a second message from the second access network device, wherein the second message acknowledges that the second access network device allows the terminal device to be handed over to the target cell, and the second message carries an identity of the target first network to which the target cell belongs.

6. The method according to claim 1, wherein the first access network device sends, to the terminal device, an identity of the target first network to which the target cell belongs.

7. The method according to claim 1, wherein the second list comprises an identity of a non-public network (NPN) of a cell that is accessed by the terminal device and that is served by the first access network device.

8. A communication method, comprising:
receiving, by a second access network device, a first message from a first access network device, wherein the first message indicates to the second access network device to prepare for a terminal device to be handed over from the first access network device to a target cell of a target first network that belongs to the second access network device, wherein
the first message carries a second list, the second list comprises an identity of at least one first network to which the terminal device subscribes, the identity of the at least one first network to which the terminal device subscribes being included in the second list indicates that the terminal device subscribes to the at least one first network, the target first network being one of the at least one first network, and the at least one first network being a private network; and
determining, by the second access network device based on the second list, the identity of the at least one first network to which the terminal device subscribes.

9. The method according to claim 8, wherein the method further comprises:
sending, by the second access network device, a second message to the first access network device, wherein the second message acknowledges that the second access network device allows the terminal device to be handed over to the target cell, and the second message carries an identity of the target first network to which the target cell belongs.

10. The method according to claim 8, wherein the method further comprises:
sending, by the second access network device, a third message to a core network device, wherein the third message indicates to the core network device to perform path switching, the third message carries indication information, and the indication information indicates whether the core network device sends one or more identities of one or more first networks of the at least one first network.

11. The method according to claim 10, wherein the method further comprises:
receiving, by the second access network device, a fourth message from the core network device, wherein the fourth message acknowledges that the core network device has completed the path switching, the fourth message carries a fourth list, and the fourth list comprises the one or more identities of the one or more first networks to which the terminal device subscribes.

12. The method according to claim 8, wherein the method further comprises:
sending, by the second access network device, first information to the first access network device, wherein the first information comprises at least one of following information: an identity of a private network covered by the second access network device, an identity of a public network that supports communication with the second access network device, an identity of a private network that supports communication with the second access network device, information about a cell corresponding to a private network that supports communication with a public network and that is covered by the second access network device, information about a cell corresponding to a public network that supports communication with a private network and that is covered by the second access network device, or an identity of a private network covered by a neighboring access network device of the second access network device.

13. The method according to claim 8, wherein the second list comprises an identity of a non-public network (NPN) of a cell that is accessed by the terminal device and that is served by the first access network device.

14. A communication method, comprising:
determining, by a core network device, one or more identities of one or more first networks to which a terminal device subscribes, wherein the one or more first networks are private networks; and
sending, by the core network device, a first list to an access network device to which the terminal device is connected, wherein the first list comprises the one or more identities of the one or more first networks to which the terminal device subscribes, and the one or more identities of the one or more first networks being included in the first list indicates that the terminal device subscribes to the one or more first networks.

15. The method according to claim 14, wherein the sending, by the core network device, the first list to the access network device comprises:
sending, by the core network device, an initial context setup request message or a path switch request acknowledge message to the access network device, wherein the initial context setup request message or the path switch request acknowledge message carries the first list.

16. The method according to claim 14, wherein before the determining, by the core network device, the one or more identities of the one or more first networks to which the terminal device subscribes, the method further comprises:
determining, by the core network device, that the terminal device supports the one or more first networks.

17. The method according to claim 14, wherein the method further comprises:
receiving, by the core network device, indication information from the access network device, wherein the indication information indicates the core network device to send, to the access network device, the one or more identities of the one or more first networks to which the terminal device subscribes.

18. The method according to claim 14, wherein the method further comprises:
receiving, by the core network device, a third list sent by the access network device, wherein the third list is determined based on subscription information received by the access network device from the terminal device.

19. The method according to claim 14, wherein the method further comprises:
receiving, by the core network device from the access network device, information indicating whether the access network device requests the one or more identifies identities of the one or more first networks to which the terminal device subscribes.

* * * * *

UNITED STATES PATENT AND TRADEMARK OFFICE
CERTIFICATE OF CORRECTION

PATENT NO. : 12,010,576 B2
APPLICATION NO. : 17/390267
DATED : June 11, 2024
INVENTOR(S) : Geng et al.

It is certified that error appears in the above-identified patent and that said Letters Patent is hereby corrected as shown below:

In the Claims

In Column 30, in Claim 19, Lines 62-63, after "more" delete "identifies".

Signed and Sealed this
Sixteenth Day of July, 2024

Katherine Kelly Vidal
*Director of the United States Patent and Trademark Office*